(12) United States Patent
Yan et al.

(10) Patent No.: US 12,481,244 B2
(45) Date of Patent: Nov. 25, 2025

(54) METHOD AND SYSTEM FOR OPTIMIZING FIRST-DIFFRACTION-ORDER RECONSTRUCTION OF HOLOGRAMS, DEVICE AND MEDIUM

(71) Applicant: Army Academy of Armored Forces of PLA, Beijing (CN)

(72) Inventors: Xingpeng Yan, Beijing (CN); Xinlei Liu, Beijing (CN); Xiaoyu Jiang, Beijing (CN); Xi Wang, Beijing (CN); Tao Jing, Beijing (CN); Cheng Song, Beijing (CN); Junhui Liu, Beijing (CN)

(73) Assignee: ARMY ACADEMY OF ARMORED FORCES OF PLA, Beijing (CN)

( * ) Notice: Subject to any disclaimer, the term of this patent is extended or adjusted under 35 U.S.C. 154(b) by 345 days.

(21) Appl. No.: 18/346,249

(22) Filed: Jul. 2, 2023

(65) Prior Publication Data
US 2024/0103439 A1 Mar. 28, 2024

(30) Foreign Application Priority Data
Sep. 20, 2022 (CN) .......................... 202211143458.3

(51) Int. Cl.
*G03H 1/08* (2006.01)
(52) U.S. Cl.
CPC ......... *G03H 1/0808* (2013.01); *G03H 1/0866* (2013.01); *G03H 2001/0883* (2013.01)
(58) Field of Classification Search
CPC .............. G03H 1/0808; G03H 1/0866; G03H 2001/0883; G03H 1/00; G03H 1/0005; G03H 1/08; G03H 2001/0816; G06N 3/00; G06N 3/02; G06N 3/04; G06N 3/0464
USPC ...... 359/9, 1, 22, 29, 32, 33, 35; 706/15, 16, 706/22, 26
See application file for complete search history.

(56) References Cited

U.S. PATENT DOCUMENTS

| | | | |
|---|---|---|---|
| 11,150,605 B1 * | 10/2021 | Xiao | G06N 3/084 |
| 2019/0317451 A1 * | 10/2019 | Supikov | G06F 18/214 |
| 2020/0117139 A1 * | 4/2020 | Supikov | G03H 1/0402 |
| 2021/0326690 A1 * | 10/2021 | Pégard | G06V 10/454 |

* cited by examiner

*Primary Examiner* — Arnel C Lavarias
(74) *Attorney, Agent, or Firm* — LOZA & LOZA, LLP; Michael Fedrick (57) ABSTRACT

A method and system for optimizing first-diffraction-order reconstruction of holograms, a device, and a medium are provided. The method includes: acquiring a target image; determining a target image light field according to the target image; calculating a target diffraction field for the target image light field by performing backward propagation by a set distance; constructing a U-Net network model; and inputting the target diffraction field into a trained U-Net network model to acquire an optimized hologram. The trained U-Net network model is obtained by constructing a U-Net network model and training and optimizing the U-Net network model, thereby continuously improving the quality of the zero-diffraction-order reconstructed image of the initial hologram and finally achieving the effect of optimizing the first-diffraction-order reconstructed image of the hologram.

11 Claims, 4 Drawing Sheets

| $\phi_1$ | $\phi_2$ | $\phi_1$ | $\phi_2$ | $\phi_1$ | $\phi_2$ |
|---|---|---|---|---|---|
| $\phi_2$ | $\phi_1$ | $\phi_2$ | $\phi_1$ | $\phi_2$ | $\phi_1$ |
| $\phi_1$ | $\phi_2$ | $\phi_1$ | $\phi_2$ | $\phi_1$ | $\phi_2$ |
| $\phi_2$ | $\phi_1$ | $\phi_2$ | $\phi_1$ | $\phi_2$ | $\phi_1$ |
| $\phi_1$ | $\phi_2$ | $\phi_1$ | $\phi_2$ | $\phi_1$ | $\phi_2$ |
| $\phi_2$ | $\phi_1$ | $\phi_2$ | $\phi_1$ | $\phi_2$ | $\phi_1$ |

METHOD AND SYSTEM FOR OPTIMIZING FIRST-DIFFRACTION-ORDER RECONSTRUCTION OF HOLOGRAMS, DEVICE AND MEDIUM

CROSS REFERENCE TO RELATED APPLICATION

This patent application claims the benefit and priority of Chinese Patent Application No. 202211143458.3, filed with the China National Intellectual Property Administration on Sep. 20, 2022, the disclosure of which is incorporated by reference herein in its entirety as part of the present application.

TECHNICAL FIELD

The present disclosure relates to the field of image processing, in particular to a method and system for optimizing first-diffraction-order reconstruction of holograms, a device and a medium.

BACKGROUND

Integrating computer technology and optical holography, Computer generated holography (CGH) can achieve some features that is difficult to achieve or even impossible to achieve by optical holography, such as controlling the size of a reconstructed object, or reconstructing objects that do not exist yet in physical reality. Spatial Light Modulator (SLM) is one of the main devices used to replace the photosensitive material in optical holography. However, SLM is mainly phase specific, which can only modulate the phase of incident light, and cannot be used for amplitude modulation. Therefore, how to generate pure phase information corresponding to diffraction field information has become the main problem to be solved for CGH. Traditional generation methods include Gerchberg-Saxton (GS) algorithm and Wirtinger Holography (WH) algorithm that are based on iterations, Double-phase Holography (DPH) and Stochastic Gradient Descent (SGD) featuring one-step coding, etc.

Traditional methods are often unable to guarantee both reconstruction quality and generation speed. DPH algorithm has the fastest generation speed, but the reconstruction quality is often on the low side. On the other hand, it takes a long iterative time for WH algorithm to generate a hologram with high reconstruction quality. In recent years, researchers have turned to combining the emerging neutral network with CGH, and have achieved desirable results in their attempt to fit the relationship between the diffraction field and the hologram through massive nodes in the network.

The holograms generated by these traditional methods and neural networks will be imaged in the center of the diffraction field when reconstructed. From the perspective of grating, the image is the zero-diffraction-order reconstructed image of the hologram. At present, the diffraction efficiency of SLM cannot reach 100%, so there may be a direct current (DC) component interfering with the zero-diffraction-order reconstructed image, resulting in the distortion of the reconstructed image. A common method to solve this problem is to introduce a simulated blazed grating to separate the zero-diffraction-order reconstructed image from the DC component. However, there is a relatively big error between the simulated blazed grating and a real grating due to the discontinuity of SLM phase.

SUMMARY

An objective of the present disclosure is to provide a method and system for optimizing first-diffraction-order reconstruction of holograms, a device and a medium, so as to improve the quality of a zero-diffraction-order reconstructed image of an initial hologram.

To achieve the above objective, the present disclosure provides the following technical solutions:

The present disclosure provides a method for optimizing first-diffraction-order reconstruction of holograms, the method including:
  acquiring a target image;
  determining a target image light field according to the target image;
  calculating a target diffraction field after the target image light field performs backward propagation by a set distance;
  constructing a U-Net network model; and
  inputting the target diffraction field into a trained U-Net network model to acquire an optimized hologram.

Optionally, said determining a target image light field according to the target image specifically includes:
  assigning 0 to an initial phase of each pixel point in the target image to acquire the target image light field.

Optionally, a target diffraction field after the target image light field performs backward propagation by a set distance is calculated using an angular spectrum method.

Optionally, a training process for the U-Net network model includes:
  acquiring an image in a DIV2K dataset;
  determining a dataset image light field according to the image in the DIV2K dataset;
  calculating a dataset diffraction field after the dataset image light field performs backward propagation by the set distance;
  inputting the dataset diffraction field into the U-Net network model to acquire a dataset hologram;
  removing a two-dimensional phase grating with a phase difference of 1 from the dataset hologram to acquire an initial hologram;
  calculating, by an angular spectrum method, a zero-diffraction-order reconstructed image after the initial hologram performs forward propagation by a set distance;
  calculating, by an L1 loss function, an error between the image in the DIV2K dataset and the corresponding zero-diffraction-order reconstructed image;
  training the U-Net network model by a backward propagation algorithm based on the error; and
  when the error meets a setting requirement, determining the corresponding U-Net network model as a trained U-Net network model.

Optionally, the target image light field is as follows:

$$U_0(x,y) = \sqrt{I(x,y)} \cdot e^{j \cdot 0};$$

where $I(x,y)$ denotes a target image, and $U_0(x,y)$ denotes a target image light field.

The present disclosure further provides a system for optimizing first-diffraction-order reconstruction of holograms. The system is applied to the foregoing method for optimizing first-diffraction-order reconstruction of holograms, and includes:
  an acquisition module configured to acquire a target image;

a target image light field determining module configured to determine a target image light field according to the target image;

a calculation module configured to calculate a target diffraction field after the target image light field performs backward propagation by a set distance;

a construction module configured to construct a U-Net network model; and an optimized hologram acquisition module configured to input the target diffraction field into a trained U-Net network model to acquire an optimized hologram.

The present disclosure also provides an electronic device, including a memory and a processor, where the memory is configured to store a computer program, and the processor runs the computer program to enable the electronic device to execute the foregoing method for optimizing first-diffraction-order reconstruction of holograms.

The present disclosure also provides a computer-readable storage medium, where the computer-readable storage medium stores a computer program, and the computer program is executed by a processor to implement the foregoing method for optimizing first-diffraction-order reconstruction of holograms.

According to the specific embodiments provided by the present disclosure, the present disclosure discloses the following technical effects:

The method for optimizing first-diffraction-order reconstruction of holograms includes: acquiring a target image; determining a target image light field according to the target image; calculating a target diffraction field after the target image light field performs backward propagation by a set distance; constructing a U-Net network model; and inputting the target diffraction field into a trained U-Net network model to acquire an optimized hologram. According to the present disclosure, a trained U-Net network model is obtained by constructing a U-Net network model and training and optimizing the U-Net network model, thereby continuously improving the quality of the zero-diffraction-order reconstructed image of the initial hologram and finally achieving the effect of optimizing the first-diffraction-order reconstructed image of the hologram.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

REFERENCE NUMERALS 1. acquisition module; 2. target light field determination module; 3. calculation module; 4. construction module; 5. optimized hologram acquisition module; 11. output layer; 12. input layer; 13. convolution layer; 14. maximum pooling layer; 15. feature map layer; 16. upper convolution layer; and 17. skip-connection.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a method and system for optimizing first-diffraction-order reconstruction of holograms, a device and a medium, so as to improve the quality of a zero-diffraction-order reconstructed image of an initial hologram.

The present disclosure provides a method for optimizing first-diffraction-order reconstruction of holograms by using a U-Net full convolution neural network in combination with a two-dimensional phase grating. First, select a target image, calculate light field distribution of the target image on a target plane, and obtain a frequency spectrum of the target light field through two-dimensional Fourier transform. According to the angular spectrum theory, the diffraction field after the target light field performs backward propagation by a distance z can be calculated, and the real part and the imaginary part of the complex amplitude distribution of the diffraction field can be input into a U-Net network and then output as a hologram. The initial hologram is acquired by removing a two-dimensional phase grating with a phase difference π from a hologram, and a zero-diffraction-order reconstructed image is acquired after the initial hologram performs forward propagation by a distance z. The two-dimensional phase grating can translate the diffraction field pattern to the center of the reconstructed image at the odd order, so the first-diffraction-order reconstructed image of the hologram generated by U-Net is consistent with the zero-diffraction-order reconstructed image of the initial hologram. By comparing the zero-diffraction-order reconstructed image of the initial hologram with the target image, the L1 loss function of the two images is obtained, and then the network parameters of U-Net are constantly updated by backward propagation, thereby continuously improving the quality of the zero-diffraction-order reconstructed image of the initial hologram and finally achieving the effect of optimizing the first-diffraction-order reconstructed image of the hologram.

To make the above-mentioned objective, features, and advantages of the present disclosure clearer and more comprehensible, the present disclosure will be further described in detail below in conjunction with the accompanying drawings and specific embodiments.

Figure 1:
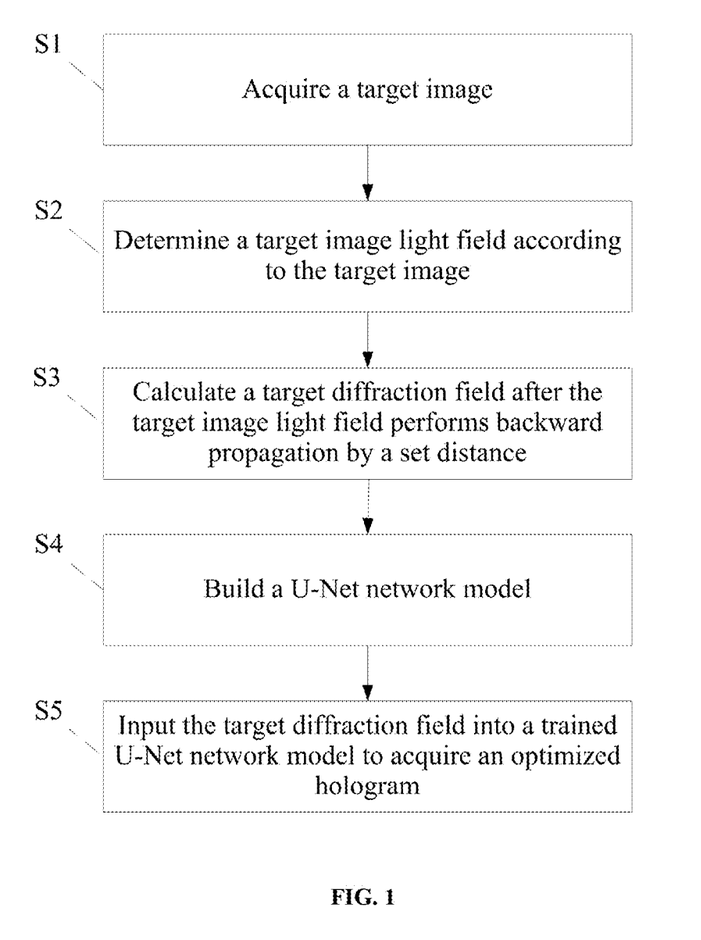
FIG. 1 is a flowchart of a method for optimizing first-diffraction-order reconstruction of holograms according to the present disclosure.

As shown in FIG. 1, the present disclosure provides a method for optimizing first-diffraction-order reconstruction of holograms, the method including the following steps:

S1: Acquire a target image.

S2: Determine a target image light field according to the target image; specifically, assign 0 to an initial phase of each pixel point in the target image to acquire the target image light field.

In practical application, an image with a resolution $N_x \times N_y$ is selected as the target image, and its intensity distribution on the target plane is I(x,y). x denotes coordinates of the target image in the horizontal direction, and y denotes coordinates of the target image in the vertical direction. assign 0 to an initial phase of each pixel point to acquire the target image light field as follows:

$$U_0(x,y)=\sqrt{I(x,y)} \cdot e^{j \cdot 0};$$

where I(x,y) denotes a target image, and $U_0$(x,y) denotes a target image light field. The target image light field indicates complex amplitude distribution in the light field of the target image.

Figure 2:
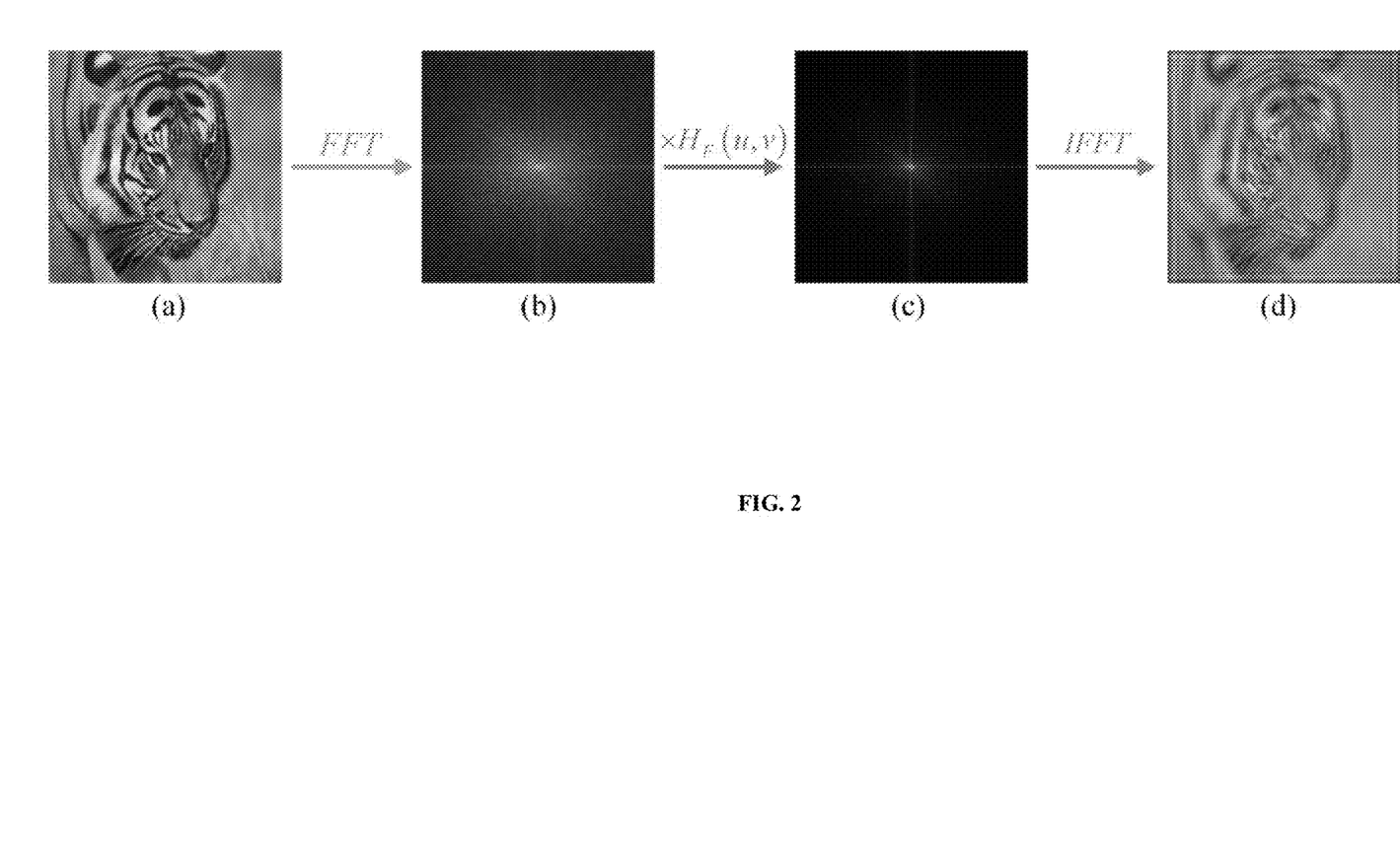
FIG. 2 is a schematic diagram regarding calculation of a diffraction field using an angular spectrum method according to the present disclosure.

S3: Calculate a target diffraction field after the target image light field performs backward propagation by a set distance; specifically, as shown in FIG. 2, FIG. 2(a) shows a target image; FIG. 2(b) shows a frequency spectrum of the target image; FIG. 2(c) shows a frequency spectrum of a diffraction field; and FIG. 2(d) shows the diffraction field. A target diffraction field after the target image light field performs backward propagation by a set distance is calculated using an angular spectrum method.

In practical application, the target image light field is subject to two-dimensional Fourier transform (FFT) to acquire the frequency spectrum $F\{U_0(x,y)\}$ of the target image light field. The optical transfer function is required when the diffraction field performing backward propagation is calculated by using the angular spectrum method, where the optical transfer function is a function of the diffraction distance and spatial frequency, which is expressed as:

$$H_F^{(-)}(f_x, f_y) = \exp\left(-j 2\pi z \sqrt{\frac{1}{\lambda^2} - f_x^2 - f_y^2}\right);$$

Where $f_x$ and $f_y$ denote spatial frequencies of complex amplitude distribution in an x direction and a y direction, z denotes a diffraction distance, and $\lambda$ denotes a wavelength of monochromatic light.

The frequency spectrum of the diffraction field is the product $F\{U_0(x,y)\} \cdot H_F^{(-)}(f_x,f_y)$ of the frequency spectrum of the target image light field and the optical transfer function. The frequency spectrum of the diffraction field is subject to Inverse fast Fourier transform (IFFT) to acquire the diffraction field after backward propagation, and the complex amplitude distribution is as follows:

$$U(x,y)=F^{-1}\{F\{U_0(x,y)\} \cdot H_F^{(-)}(f_x,f_y)\}$$

Figure 3:
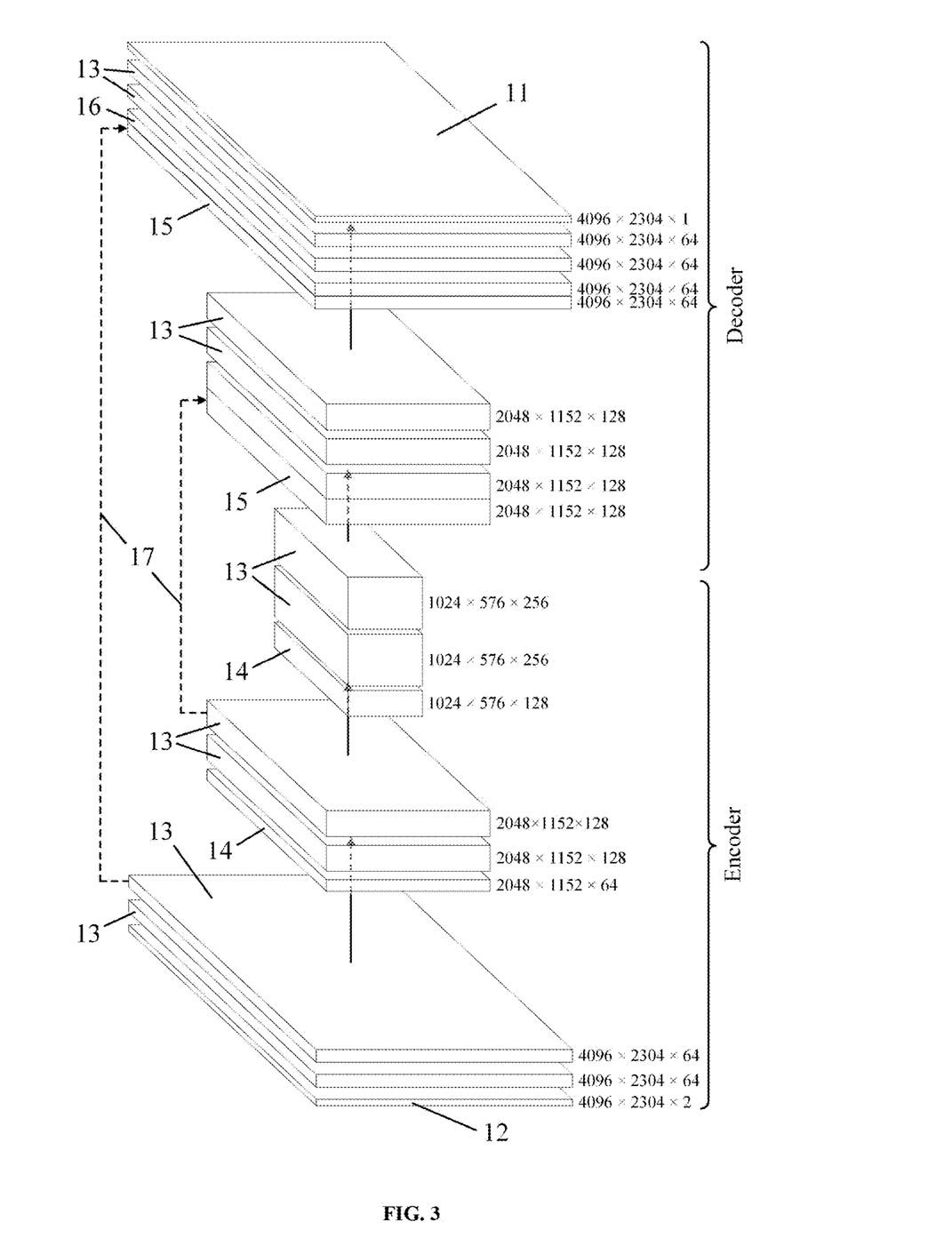
FIG. 3 is a structural schematic diagram of a U-Net network model according to the present disclosure.

S4: Build a U-Net network model; specifically, U-Net is a full convolution neural network, which uses a convolution layer to connect upper and lower sampling layers, and includes an output layer 11, an input layer 12, a convolution layer 13, a maximum pooling layer 14, a feature map layer 15 and an upper convolution layer 16. The second convolution layer 13 with a size of 4096×2304×64 of an encoding part connects the first convolution layer 13 with a size of 4096×2304×64 of a decoding part by skip-connection 17. The second convolution layer 13 with a size of 2048×1152×128 of the encoding part connects the first convolution layer 13 with a size of 2048×1152×128 of the decoding part by skip-connection 17. As shown in FIG. 3, the design parameters of the U-Net network model are as follows: the input layer consists of two channels, corresponding to a real part and an imaginary part of the backward-propagating diffraction field U(x,y) The output layer is a channel, which refers to pure phase information corresponding to the diffraction field. The network model has two downsampling layers and two upsampling layers, and a maximum feature channel after sampling is set to 1024. After the network model is configured according to the above parameters, the phase-only hologram of the output can be acquired by inputting the diffraction field U(x,y) into U-Net, and the phase distribution can be expressed as $\phi_{CGH}$(x,y). The convolution layer 13 is Conv3*3+Relu, the maximum pooling layer 14 is Max pool2*2, and the upper convolution layer 16 is Up-conv2*2.

S5: Input the target diffraction field into a trained U-Net network model to acquire an optimized hologram.

In addition, the method for optimizing first-diffraction-order reconstruction of holograms further includes: train the U-Net network model; where the training process for the U-Net network model includes:

S01: Acquire an image in a DIV2K dataset.

S02: Determine a dataset image light field according to the image in the DIV2K dataset.

S03: Calculate a dataset diffraction field after the dataset image light field performs backward propagation by the set distance.

S04: Input the dataset diffraction field into the U-Net network model to acquire a dataset hologram.

Figure 4:
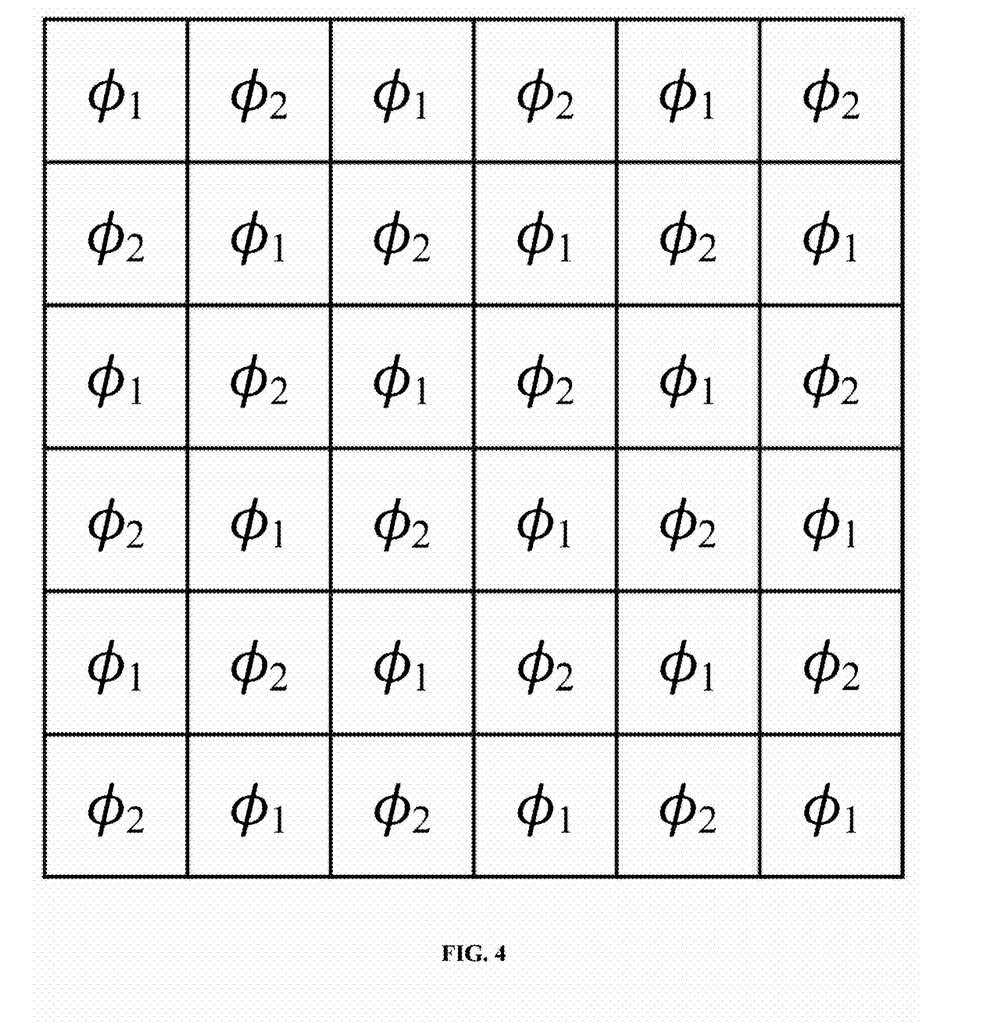
FIG. 4 is a schematic diagram of a two-dimensional phase grating according to the present disclosure.

S05: Remove a two-dimensional phase grating with a phase difference of $\pi$ from the dataset hologram to acquire an initial hologram; FIG. 4 shows a two-dimensional phase grating with cross-distributed phases $\phi_1$ and $\phi_2$, and the phase distribution function may be expressed as:

$$\phi_{gra}^{(\pi)}(x, y) = (\phi_2 - \phi_1) rect\left(\frac{x}{a}, \frac{y}{a}\right) *$$

$$\frac{1}{4a^2}\left[comb\left(\frac{x}{2a}, \frac{y}{2a}\right) + comb\left(\frac{x-a}{2a}, \frac{y-a}{2a}\right) + e^{j\phi_1}\right]_{|\phi_2 - \phi_1| = \pi};$$

Where a denotes a pixel interval of the spatial light modulator (SLM);

$$rect\left(\frac{x}{d}\right) = \begin{cases} 1, |x| \leq \frac{d}{2} \\ 0, others \end{cases}; comb\left(\frac{x}{\tau}\right) = \tau \sum_{n=-\infty}^{\infty} \delta(x - n\tau);$$

d denotes an opening size of a rectangular window function, $\tau$ denotes a proportional constant of a comb function, $\delta$ denotes a pulse function, and n is an integer.

Remove a two-dimensional phase grating with a phase difference of $\pi$ from the dataset hologram to acquire an initial hologram, phase distribution of which can be expressed as:

$$\phi'_{CGH}(x,y)=\phi_{CGH}(x,y)-\phi_{gra}^{(\pi)}(x,y);$$

where $\phi'_{CGH}$(x,y) denotes an initial hologram, and $\phi_{CGH}$(x, y) denotes a dataset hologram.

S06: Calculate, by an angular spectrum method, a zero-diffraction-order reconstructed image after the initial hologram performs forward propagation by a set distance. Specifically, the diffraction field after the initial hologram performs forward propagation by a distance z can be calculated by the angular spectrum method as follows: $U'(x,y) = F^{-1}\{F\{\exp[j\phi'_{CGH}(x,y)]\} \cdot H_F^{(+)}(f_x,f_y)\}$. Where $H_F^{(+)}(f_x,f_y)$ denotes an optical transfer function used when using the angle spectrum method to propagate the light field, which is expressed as:

$$H_F^{(+)}(f_x, f_y) = \exp\left(j2\pi z\sqrt{\frac{1}{\lambda^2} - f_x^2 - f_y^2}\right).$$

The zero-diffraction-order reconstructed image after the initial hologram performs forward propagation by a distance of z is I'(x,y)=|U'(x,y)|². Since the two-dimensional phase grating can translate the diffraction field pattern to the center of the odd diffraction order, the first-diffraction-order reconstructed image of the hologram superimposed by the two-dimensional phase grating corresponds to the zero-diffraction-order reconstructed image of the initial hologram.

S07: Calculate, by an L1 loss function, an error between the image in the DIV2K dataset and the corresponding zero-diffraction-order reconstructed image; specifically, compare the zero-diffraction-order reconstructed image I'(x,y) of the initial hologram with a target image I(x,y), an L1 loss function with a stability solution is used, which is expressed as:

$$L_1 = \Sigma |I(x,y) - I'(x,y)|.$$

S08: Train the U-Net network model by a backward propagation algorithm based on the error; specifically, the L1 loss function is subject to backward propagation to update network parameters of U-Net.

S09: When the error meets a setting requirement, determine the corresponding U-Net network model as a trained U-Net network model.

In practical application, the DIV2K dataset is used as a training set of U-Net, and steps S01 to S09 are repeated continuously. The parameters of the network model are constantly updated by the backward propagation of the loss function, such that the quality of the zero-diffraction-order reconstructed image of the initial hologram (that is, the first-diffraction-order reconstructed image of the hologram generated by U-Net) is continuously improved.

According to the present disclosure, by comparing the zero-diffraction-order reconstructed image of the initial hologram with the target image, the L1 loss function of the two images is obtained, and then the network parameters of U-Net are constantly updated by backward propagation, thereby continuously improving the quality of the zero-diffraction-order reconstructed image of the initial hologram and finally achieving the effect of optimizing the first-diffraction-order reconstructed image of the hologram.

Embodiment II

In order to perform the method in the above embodiment I to achieve the corresponding features and technical effects, a system for optimizing first-diffraction-order reconstruction of holograms is provided below.

Figure 5:
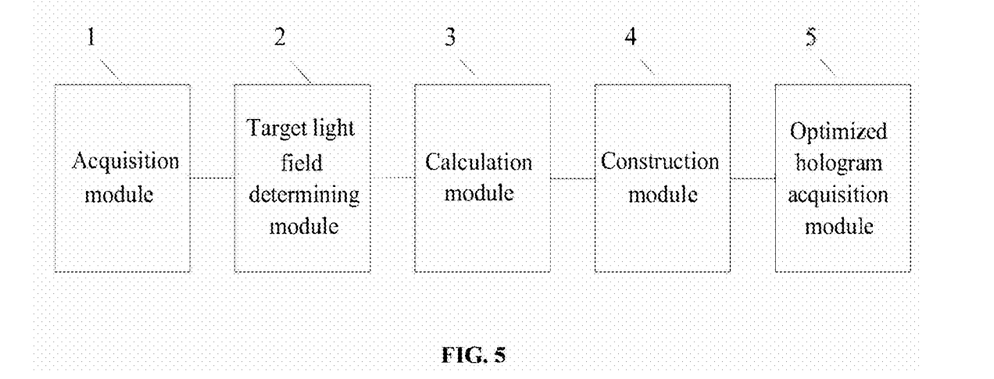
FIG. 5 is a module diagram of a system for optimizing first-diffraction-order reconstruction of holograms according to the present disclosure.

The present disclosure provides a system for optimizing first-diffraction-order reconstruction of holograms. As shown in FIG. 5, the system includes:
   an acquisition module 1 configured to acquire a target image;
   a target image light field determining module 2 configured to determine a target image light field according to the target image;
   a calculation module 3 configured to calculate a target diffraction field after the target image light field performs backward propagation by a set distance;
   a construction module 4 configured to construct a U-Net network model; and
   an optimized hologram acquisition module 5 configured to input the target diffraction field into a trained U-Net network model to acquire an optimized hologram.

Embodiment III

The embodiment of the present disclosure provides an electronic device including a memory and a processor, where the memory is configured to store a computer program, and the processor runs the computer program to enable the electronic device to execute the method for optimizing first-diffraction-order reconstruction of holograms according to Embodiment I.

Optionally, the electronic device may be a server.

In addition, the embodiment of the present disclosure further provides a computer readable storage medium storing a computer program. The computer program is executed by a processor to implement the method for optimizing first-diffraction-order reconstruction of holograms according to Embodiment I.

Compared with a traditional method of generating a hologram by a neural network, the method and system for optimizing first-diffraction-order reconstruction of holograms, the device and the medium provided in the present disclosure have the following advantages:

1. The interference by the DC component is avoided. The traditional method optimizes the zero-diffraction-order reconstructed image. However, since the SLM diffraction efficiency is less than 100%, the zero-diffraction-order reconstructed image is likely to be disturbed by a DC component, resulting in image distortion. The lower the SLM diffraction efficiency is, the stronger the interference by the DC component is, and the more serious the image distortion is. The method provided in the present disclosure aims at optimizing the first-diffraction-order image, which is not in the same propagation direction as the zero-diffraction-order image. Therefore, zero-diffraction-order images and DC components can be easily filtered out by the filter, and a clear first-diffraction-order image can be acquired.

2. The error caused by the introduction of a blazed grating is avoided. In order to observe a clear zero-diffraction-order reconstructed image, the traditional method is to introduce a simulated blazed grating to separate the zero-diffraction-order reconstructed image from the first-diffraction-order reconstructed image. However, due to the phase discontinuity of SLM, the simulated blazed grating is largely different from a real blazed grating in that the phase of the former is distributed in a stepped manner, and there is a large jump at the junction of pixel points, which thus causes a great error. By contrast, the two-dimensional phase grating is characterized by discrete binary distribution, and has no continuous phase, which is very consistent with SLM and will not cause any error.

3. The method achieves more flexibility and higher speed. Compared with the traditional method, by using a U-Net neural network to generate a hologram, network parameters can be flexibly adjusted according to the generation quality and speed, so as to achieve a better balance between the generation speed and reconstruction quality. However, given that the encoding mode of the traditional method is single, the relationship between the reconstruction quality and generation speed is relatively fixed and cannot be adjusted.

4. A smoother phase can be generated. Compared with the traditional method, regarding the hologram generated by U-Net neural network, phase changes more smoothly, which avoids the phenomenon like phase hits. In this way, circles in the image reconstructed by DPH algorithm and speckle noise in the image reconstructed by WH algorithm are avoided.

Each embodiment of the present specification is described in a progressive manner, each example focuses on the difference from other examples, and the same and similar parts between the examples may refer to each other. Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present specification shall not be construed as limitations to the present disclosure.

What is claimed is:

1. A method for optimizing first-diffraction-order reconstruction of holograms, the method comprising:
acquiring a target image;
determining a target image light field according to the target image;
calculating a target diffraction field for the target image light field by performing backward propagation by a set distance;
constructing a U-Net network model; and
inputting the target diffraction field into a trained U-Net network model to acquire an optimized hologram.

2. The method for optimizing first-diffraction-order reconstruction of holograms according to claim 1, wherein said determining a target image light field according to the target image specifically comprises:
assigning 0 to an initial phase of each pixel point in the target image to acquire the target image light field.

3. The method for optimizing first-diffraction-order reconstruction of holograms according to claim 1, wherein the target diffraction field for the target image light field calculated by performing backward propagation by the set distance is calculated using an angular spectrum method.

4. The method for optimizing first-diffraction-order reconstruction of holograms according to claim 1, wherein a training process for the U-Net network model comprises:
acquiring an image in a DIV2K dataset;
determining a dataset image light field according to the image in the DIV2K dataset;
calculating a dataset diffraction field after the dataset image light field performs backward propagation by the set distance;
inputting the dataset diffraction field into the U-Net network model to acquire a dataset hologram;
removing a two-dimensional phase grating with a phase difference of x from the dataset hologram to acquire an initial hologram;
calculating, by an angular spectrum method, a zero-diffraction-order reconstructed image after the initial hologram performs forward propagation by the set distance;
calculating, by an L1 loss function, an error between the image in the DIV2K dataset and the corresponding zero-diffraction-order reconstructed image;
training the U-Net network model by a backward propagation algorithm based on the error; and
when the error meets a setting requirement, determining the corresponding U-Net network model as a trained U-Net network model.

5. The method for optimizing first-diffraction-order reconstruction of holograms according to claim 1, wherein the target image light field is given as follows:

$$U_0(x,y)=\sqrt{I(x,y)}\cdot e^{j\cdot 0};$$

wherein $I(x,y)$ denotes a target image, and $U_0(x,y)$ denotes a target image light field.

6. A system for optimizing first-diffraction-order reconstruction of holograms, the system comprising:
an acquisition module configured to acquire a target image;
a target image light field determining module configured to determine a target image light field according to the target image;
a calculation module configured to calculate a target diffraction field after the target image light field performs backward propagation by a set distance;
a construction module configured to construct a U-Net network model; and
an optimized hologram acquisition module configured to input the target diffraction field into a trained U-Net network model to acquire an optimized hologram.

7. An electronic device comprising a non-transitory memory and a processor, wherein the non-transitory memory is configured to store a computer program and the processor runs the computer program to enable the electronic device to execute the method for optimizing first-diffraction-order reconstruction of holograms according to claim 1.

8. The electronic device according to claim 7, wherein said determining a target image light field according to the target image specifically comprises:
assigning 0 to an initial phase of each pixel point in the target image to acquire the target image light field.

9. The electronic device according to claim 7, wherein the target diffraction field for the target image light field calculated by performing backward propagation by the set distance is calculated using an angular spectrum method.

10. The electronic device according to claim 7, wherein a training process for the U-Net network model comprises:
acquiring an image in a DIV2K dataset;
determining a dataset image light field according to the image in the DIV2K dataset;
calculating a dataset diffraction field after the dataset image light field performs backward propagation by the set distance;
inputting the dataset diffraction field into the U-Net network model to acquire a dataset hologram;
removing a two-dimensional phase grating with a phase difference of x from the dataset hologram to acquire an initial hologram;
calculating, by an angular spectrum method, a zero-diffraction-order reconstructed image after the initial hologram performs forward propagation by the set distance;
calculating, by an L1 loss function, an error between the image in the DIV2K dataset and the corresponding zero-diffraction-order reconstructed image;

training the U-Net network model by a backward propagation algorithm based on the error; and when the error meets a setting requirement, determining the corresponding U-Net network model as a trained U-Net network model.

11. The electronic device according to claim 7, wherein the target image light field is given as follows:

$$U_0(x,y) = \sqrt{I(x,y)} \cdot e^{j \cdot 0};$$

wherein I(x,y) denotes a target image, and $U_0(x,y)$ denotes a target image light field.

* * * * *